(12) United States Patent
Carnevale et al.

(10) Patent No.: US 10,360,161 B2
(45) Date of Patent: Jul. 23, 2019

(54) CABLE LOCK WITH CONFIDENTIAL DATA PROTECTION

(71) Applicant: INTERNATIONAL BUSINESS MACHINES CORPORATION, Armonk, NY (US)

(72) Inventors: Giulia Carnevale, Rome (IT); Vittorio Carullo, Rome (IT); Marco Gianfico, Saint'antimo (IT); Roberto Ragusa, Rome (IT); Emanuele Vercalli, Viterbo (IT)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 15/472,380

(22) Filed: Mar. 29, 2017

(65) Prior Publication Data
US 2018/0285285 A1 Oct. 4, 2018

(51) Int. Cl.
G06F 1/16 (2006.01)
G06F 12/14 (2006.01)
G06F 21/70 (2013.01)
H04L 9/32 (2006.01)
G06F 21/64 (2013.01)

(52) U.S. Cl.
CPC ...... *G06F 12/1466* (2013.01); *G06F 12/1408* (2013.01); *G06F 21/64* (2013.01); *G06F 21/70* (2013.01); *H04L 9/3242* (2013.01); *G06F 1/1632* (2013.01); *G06F 2212/1052* (2013.01)

(58) Field of Classification Search
None
See application file for complete search history.

(56) References Cited

U.S. PATENT DOCUMENTS

| 4,985,695 A | 1/1991 | Wilkinson et al. |
| 5,327,752 A | 7/1994 | Myers et al. |

(Continued)

FOREIGN PATENT DOCUMENTS

| CN | 201433622 Y | 3/2010 |
| DE | 102013005602 A1 | 10/2014 |
| WO | WO2009069188 A1 | 6/2009 |

OTHER PUBLICATIONS

Peter Mell et al, The NIST Definition of Cloud Computing, National Institute of Standards and Technology, Publication 800-145, 2011.

*Primary Examiner* — Fatoumata Traore
(74) *Attorney, Agent, or Firm* — Patrick J. Daugherty; Daugherty & Del Zoppo Co., LPA

(57) ABSTRACT

A lock base attached to a computer housing has a controller in circuit communication with a processor of the computer. A cable socket comprising a flash memory locks onto the lock base, two ends of an internal wire of the cable form a closed electric circuit loop with the lock base through the entirety of the body of the cable, and the controller performs a handshake with the processor of the computerized device and the flash memory that generates a checksum key stored on the flash memory, the computerized device requiring access to the checksum key on the flash memory for access to data on a memory device of the computerized device. Absent a keyed unlocking, the controller erases the checksum key from the flash memory in response to a break in the circuit loop or dislocation of the cable socket from the lock base.

20 Claims, 4 Drawing Sheets

(56) References Cited

U.S. PATENT DOCUMENTS

| | | | |
|---|---|---|---|
| 5,381,685 A | 1/1995 | Carl et al. | |
| 5,911,777 A * | 6/1999 | Heredia | G06F 1/1632 710/303 |
| 6,297,963 B1 | 10/2001 | Fogle | |
| 6,744,627 B2 | 6/2004 | Won et al. | |
| 7,479,879 B2 | 1/2009 | Merrem et al. | |
| 7,515,048 B1 * | 4/2009 | Bhattiprolu | G07C 9/00309 340/5.64 |
| 8,314,700 B2 | 11/2012 | Hamzy et al. | |
| 8,854,812 B2 | 10/2014 | Fan | |
| 2006/0107073 A1 * | 5/2006 | Lane | E05B 73/0005 713/194 |
| 2007/0074547 A1 | 4/2007 | Wu | |
| 2015/0048102 A1 | 2/2015 | Dickie et al. | |
| 2015/0278556 A1 * | 10/2015 | Avni | G06F 21/81 726/35 |

\* cited by examiner

CABLE LOCK WITH CONFIDENTIAL DATA PROTECTION

BACKGROUND

Cable lock mechanisms may be used to physically connect a laptop computer, tablet, cell phone or other programming device to a fixed structural location (a laptop docking station, wall bracket, table leg, etc.). One commonly used cable lock system is a "Kensington" cable lock, wherein a small, metal-reinforced hole (sometimes referred to as a "Kensington Security Slot" or "K-Slot") is provided on small or portable computers and electronics equipment (for example, laptops, computer monitors, desktop computers, gaming consoles, and video projectors, etc.) and combined with a metal anchor attached to a rubberized metal cable secured with a key or combination lock. The end of the cable has a small loop that allows the cable to be looped around a permanent object, such as a heavy table or other similar equipment, Generally, the intention of installing a cable lock is to prevent or discourage theft or other unauthorized removals from a specific physical location, beyond the range of the cable lock relative to some fixed point. A number of factors determine the strength of the security achieved by cable lock systems, including the resiliency of the cable or the structural connections thereto, and the effectiveness of any alarm system associated with the cable in alerting a responsible party (shopkeeper, computer center monitor, loss prevention officer, etc.).

SUMMARY

In one aspect of the present invention, a computerized method for securing data on a computerized device includes executing steps on a computer processor. In response to a locking operation of a key that locks a cable socket onto a lock base that is attached to a housing of a computerized device, thereby forming a closed electric circuit loop between the lock base and two ends of a wire that project from the cable socket, the wire disposed through the entirety of a body of a cable connected to the cable socket, a controller processor within the lock base performs a handshake with a flash memory located within the cable socket, the handshake generating a checksum key. The controller processor stores the checksum key on the flash memory, wherein the computerized device requires access to the checksum key on the flash memory for access to data on a memory device of the computerized device. The controller processor erases the checksum key from the flash memory in response to determining an absence of an unlocking operation of the key in combination with a break in the closed electric circuit loop, or with a dislocation of the cable socket from the lock base.

In another aspect, a system includes a lock base configured for attachment to a housing of a computerized device; a controller located within the lock base, the controller in circuit communication with a processor of the computerized device; a cable socket comprising a flash memory and configured to lock onto the lock base via a locking operation of a key; and a cable attached to the cable socket and including an internal wire, wherein two ends of the wire project from the cable socket and the wire is disposed in a loop from the two ends through an entirety of a body of the cable. In response to locking the cable socket onto the lock base via the locking operation of the key, the wire forms a closed electric circuit loop with the lock base from the wire ends through the entirety of the body of the cable, and the controller performs a handshake with the processor of the computerized device and the flash memory, and in response to the handshake generates a checksum key that is stored on the flash memory, and wherein the computerized device requires access to the checksum key on the flash memory for access to data on a memory device of the computerized device. The controller erases the checksum key from the flash memory in response to determining an absence of an unlocking operation of the key in combination with a break in the closed electric circuit loop, or with a dislocation of the cable socket from the lock base.

In another aspect, a computer program product for securing data on a computerized device has a computer-readable storage medium with computer readable program code embodied therewith. The computer readable hardware medium is not a transitory signal per se. The computer readable program code includes instructions for execution which cause a processor of a controller located in a lock base to, in response to a locking operation of a key that locks a cable socket onto the lock base that is attached to a housing of a computerized device, thereby forming a closed electric circuit loop between the lock base and two ends of a wire that project from the cable socket, the wire disposed through the entirety of a body of a cable connected to the cable socket, perform a handshake with a flash memory located within the cable socket, the handshake generating a checksum key. The controller processor stores the checksum key on the flash memory, wherein the computerized device requires access to the checksum key on the flash memory for access to data on a memory device of the computerized device. The controller processor erases the checksum key from the flash memory in response to determining an absence of an unlocking operation of the key in combination with a break in the closed electric circuit loop, or with a dislocation of the cable socket from the lock base.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
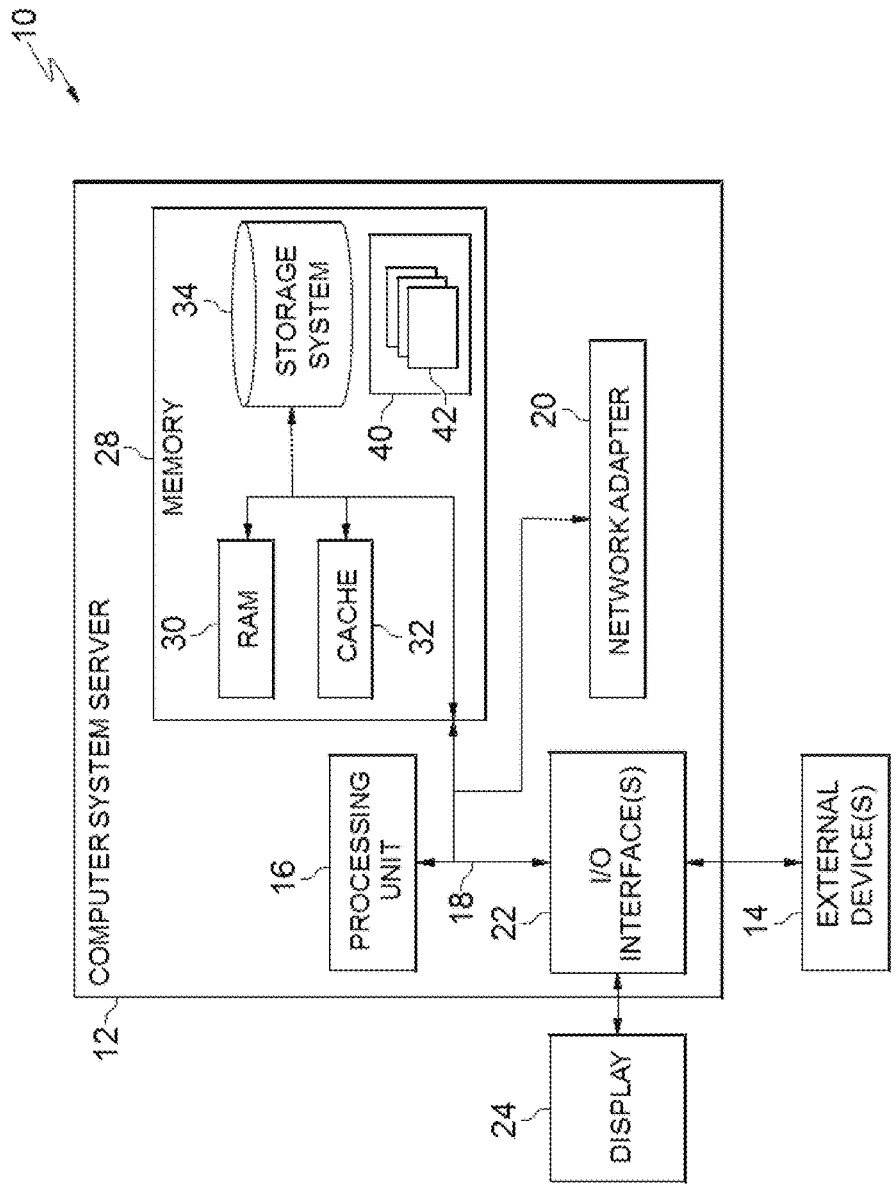
FIG. 1 depicts a computerized aspect according to an embodiment of the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic of an example of a programmable device implementation 10 according to an aspect of the present invention. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computerized device 12 is operational with numerous other general purpose or special purpose computing system environments or configurations. Examples of well-known computing systems, environments, and/or configurations that may be suitable for use with the computerized device 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computerized device 12 may be described in the general context of computer system-executable instructions, such as program modules, being executed by a computer system. Generally, program modules may include routines, programs, objects, components, logic, data structures, and so on that perform particular tasks or implement particular abstract data types. The computerized device 12 may be practiced in distributed cloud computing environments where tasks are performed by remote processing devices that are linked through a communications network. In a distributed cloud computing environment, program modules may be located in both local and remote computer system storage media including memory storage devices.

The computerized device 12 is shown in the form of a general-purpose computing device. The components of computerized device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computerized device 12 typically includes a variety of computer system readable media. Such media may be any available media that is accessible by computerized device 12, and it includes both volatile and non-volatile media, removable and non-removable media.

System memory 28 can include computer system readable media in the form of volatile memory, such as random access memory (RAM) 30 and/or cache memory 32. The computerized device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computerized device 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computerized device 12 can communicate with one or more networks such as a local area network (LAN), a general wide area network (WAN), and/or a public network (e.g., the Internet) via network adapter 20. As depicted, network adapter 20 communicates with the other components of computerized device 12 via bus 18. It should be understood that although not shown, other hardware and/or software components could be used in conjunction with computerized device 12. Examples, include, but are not limited to: microcode, device drivers, redundant processing units, external disk drive arrays, RAID systems, tape drives, and data archival storage systems, etc.

Prior art Kensington locks afford limited theft protection measures. Because most computer equipment cases are generally made of plastic or thin metal, the Kensington can be torn out, though not without doing significant visible damage to the case. Thus, the Kensington cable can be seen mostly as a deterrent for thieves, wherein a laptop cannot be left alone for a long time, otherwise a thief will have enough time to break the lock or cut the cable without causing any damage to the laptop functionality. When this occurs, a thief can have access to company's confidential information and/or to data not originally meant to be publicly shared.

Figure 2:
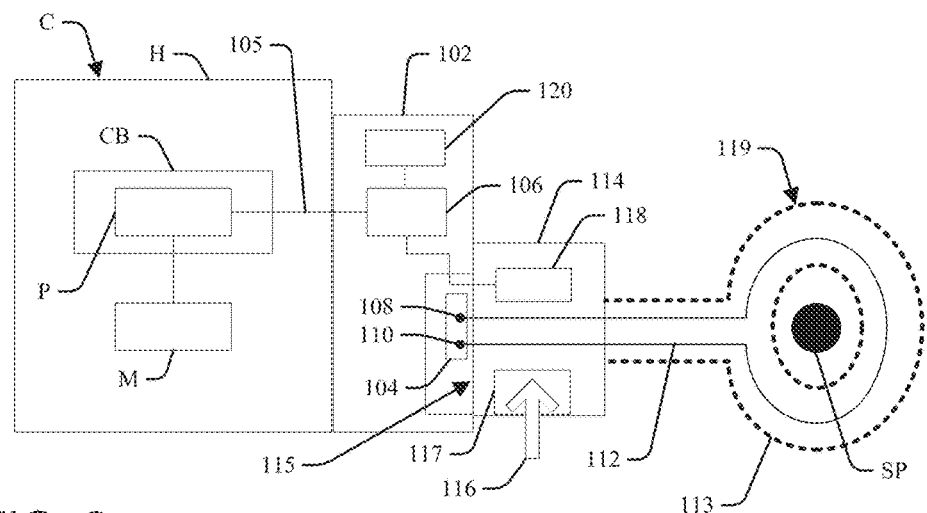
FIG. 2 is a block diagram illustration of an embodiment of the present invention.

FIG. 2 is a block diagram illustration of a system or device according to the present invention. A Kensington-type lock base 102 is attached to a housing H of a computerized device C (for example, a laptop computer case, desktop computer cabinet, a gaming console, an outer shell of a tablet or smart phone, etc.) and includes a wire reception socket 104 and a controller 106 that is in circuit communication 105 with a processor P of the computerized device C. Embodiments of the controller 106 include the computerized device 12 of FIG. 1 as described above (or components thereof inclusive of the processor or processing unit 16). The circuit communication 105 may be a hard wired or wireless connection (for example, WiFi, Bluetooth, radio frequency identification (RFId), or other wireless protocol).

The wire reception socket 104 is formed to receive each of two ends 108 and 110 of a contiguous wire 112 that project from a face 115 of the cable socket 114 at an end of a security or locking cable 113. The wire 112 is disposed in a loop through the entirety of a body of the cable 113 and forms a closed electric circuit loop with a cable reception socket 104 of the lock base 102 in response to locking the cable socket 114 onto the lock base 102 via a locking operation (engagement) of a key 116 within (with) a key cylinder 117.

The locking operation may include inserting the key 116 into the locking cylinder 117, turning the key into a locked position and removing the key 116 from the cylinder 117, thereby locking the socket 114 onto the base 102; and wherein a corresponding unlocking operation comprises inserting the key 116 into the locking cylinder 117 and turning the key into an unlocked position, wherein the socket 114 may be removed from the base 102. The cable is formed to provide a loop 119 (or other attachment configuration, not shown) to dispose about a structure or other fixed point SP for security purposes. The cable 113 may also be threaded through the loop structure 119 to thereby form a loop with a remaining body of the cable 113 that may be disposed about a fixed structure SP. Still other locking, unlocking and securing operations will be appreciated as appropriate to practice with embodiments of the present invention by one skilled in the art.

The cable socket 114 includes a flash memory 118 that forms a circuit connection with the controller 106 in response to locking the socket 114 onto the lock base 102 via the locking operation of the key 116, wherein the controller 106 performs a handshake with the processor P of the computerized device C and the flash memory 118 to generate a checksum key as a function of numeric representations of unique indicia associated with the controller 106 and one or more of the flash memory 118, a circuit board CB including the processor P of the computerized device C, a memory M of the computerized device C, or some other component of the computerized device C. The computerized device is configured by the controller to require access to the checksum key on the flash memory for access to data on the memory device M of the computerized device C.

The controller 106 erases the checksum key from the flash memory 118, thereby rendering data on the computerized device C memory M unreadable or inaccessible, in response to detecting, without an association to a corresponding unlocking operation or position of the key 116 relative to the cable socket 114, either (i) an interruption (break) in the closed electric circuit loop formed by the wire 112 with the female cable reception socket 104; or (ii) a separation of the cable socket 114 from the lock base 102. Thus, disconnection of the socket 114 and lock base 102, or interruption of the circuit loop of the wire 112, is considered appropriate (and the memory M remaining readable and accessible) only when done with (associated with) an unlocking operation or position of the key 116.

Otherwise, any physical detachment of the cable 113 relative to the lock base 102 without use of the key 116, such as by force, including cutting the cable 113 or destroying one of the cable reception socket 104 or the male socket 114 support structure where the cable 113 is secured, will break the electric circuit and trigger erasure of the checksum key. Such actions are typically associated with moving the programmable device C from its original position relative to the fixed security point SP beyond the physical reach of the cable 113 fixed thereupon, and are considered an improper disconnection.

Figure 3:
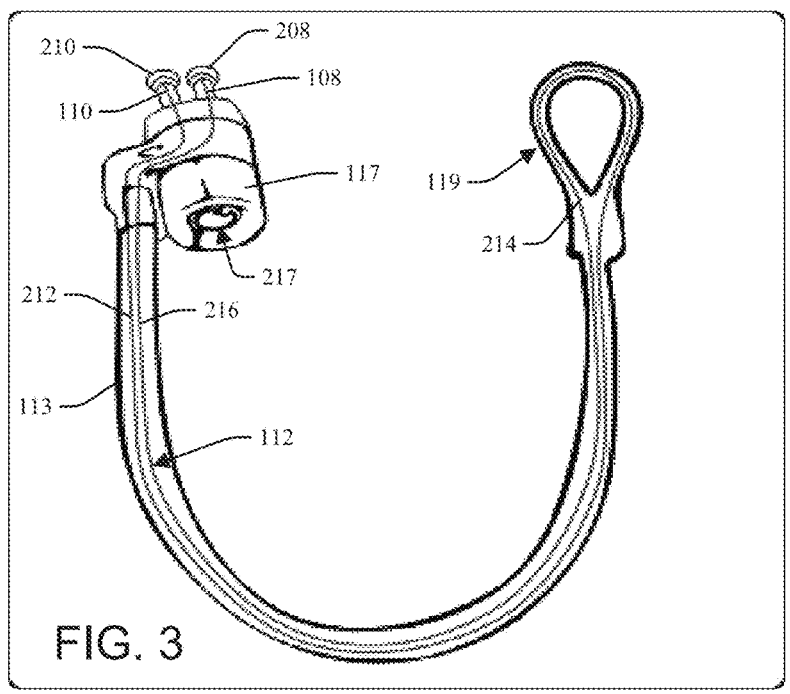
FIG. 3 is an illustration of aspects of an embodiment of the present invention.

FIG. 3 illustrates one embodiment of the cable 113 and wire 112 structure, wherein the wire 112 is disposed in a first strand portion 212 from wire end 110 through the cable body 113 to a loop portion 214 passing around the end loop 119 and returning in second strand portion 216 that is parallel to the first strand 212 to terminate in the other wire end 108. Thus, cutting the cable body 113 at the loop 119 would necessarily cut the wire 112 loop portion 214. The two wire ends 108 and 110 are attached to respective circular flanges 208 and 210 that are formed for fitting into corresponding sockets (not shown) on the cable reception socket 104. The locking cylinder 117 has a cylindrical aperture 217 for receiving the lock key 116.

Figures 4A, 4B:
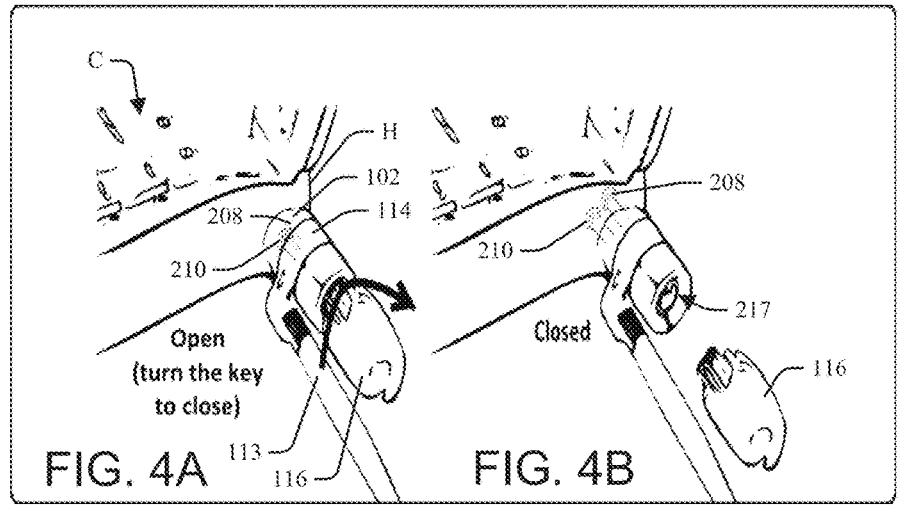
FIGS. 4A and 4B are alternative illustrations of aspects of an embodiment of the present invention.

FIG. 4A illustrates a view of the embodiment of the cable 113 of FIG. 3 in an open (unlocked) with respect to the locking base 102 via position of the key 116 inserted into the locking cylinder of the socket 114 as attached to the housing H of a laptop computer C. FIG. 4B illustrates a view of the cable 113 of FIG. 4A in a closed (locked) position with respect to the locking base 102 by turning the key 116 into a locked position and removing the key 116 from the cylindrical aperture 217. Comparing the views 4A and 4B reveals different positions of the circular flanges 208 and 210 relative to each other in the respective locked and unlocked position, in some embodiments as a function of entering into engagement with the corresponding sockets (not shown) on the cable reception socket 104.

Figure 5:
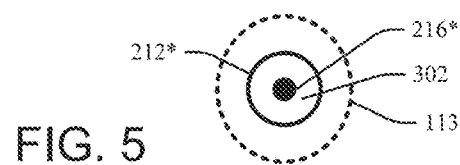
FIG. 5 is an illustration of aspects of another embodiment of the present invention.

FIG. 5 is a cross-sectional representation of an alternative, coaxial wire embodiment of the present invention, wherein a "first strand" cylindrical portion 212* extends from the wire end 110 (FIG. 2) through the cable body 113 to a loop portion (not shown) passing around the end loop 119 which has an outer cylindrical form 212* that encompasses an inner wire 216* returning from the loop portion to terminate in the other wire end 108 (FIG. 2). This alternative embodiment provides further protection from defeat of the data protection system of the present invention by shunting or bridging cut wire 112 portions in order to maintain the electrical circuit flowing from one of the ends 108 and 110 to the other. More particularly, to counter a possible double cut, where an attacker manages to create a bridge between the two wires above the cut point and the two wires below the cut point, so to create an alternative signal flow which will not be interrupted when cutting the main strong cable, this embodiment locates one of the two signal wires 216* within the other (coaxial cable) wire 212*, with a thin isolating film 302 located between them. In this arrangement, it is very difficult to access the internal conductor 216* without opening the circuit and without shorting the two wire portions 212* and 216*, wherein the controller 106 is configured to trigger data protection measures as described herein in response to detecting a short-circuit connection directly between the two wire portions 212* and 216*.

Figure 6A:
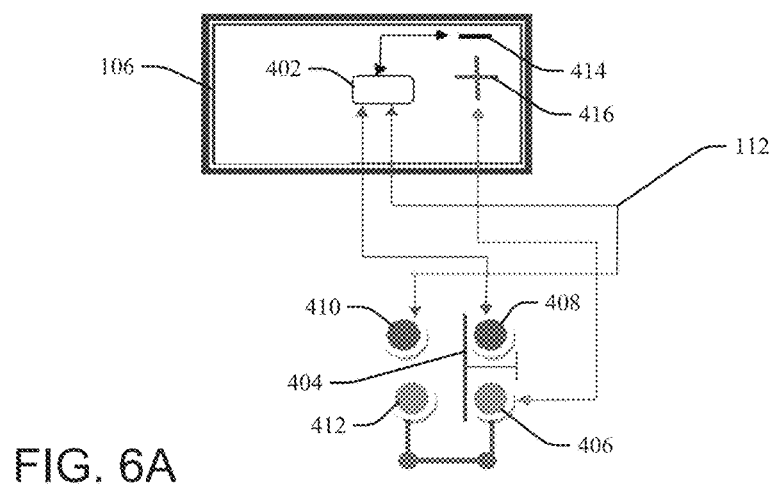
FIGS. 6A and 6B are alternative electrical schematic illustrations of an embodiment of the present invention.
Figure 6B:
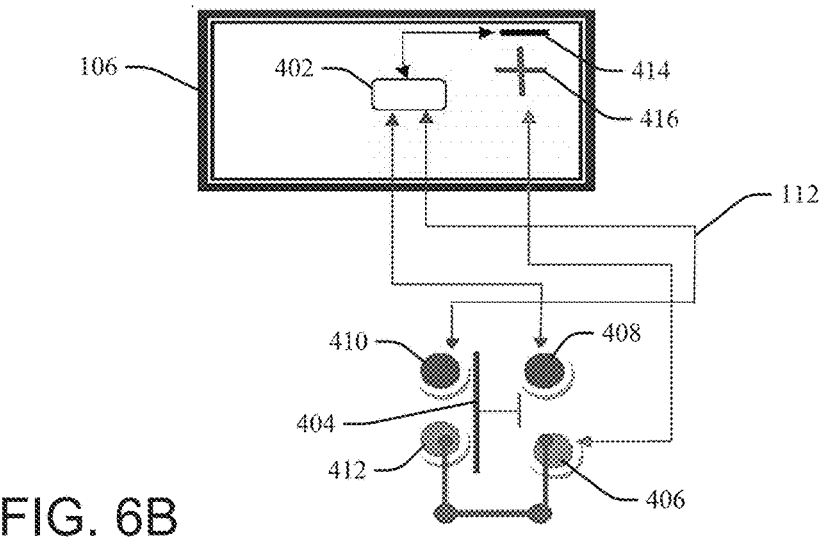

FIGS. 6A and 6B are schematic illustrations of two different electrical circuit relationships of the controller 106 relative to the cable wire 112, each generated via different positioning of a conductive bayonet contact 404 that is movable in response to positioning of the key 116 (FIG. 2) within the locking mechanism 117 (FIG. 2). In FIG. 6A the bayonet contact 404 is in an "unplugged" position, via unlocking the cable 113 by use of the key 116 (for example, as illustrated in FIG. 4B). Thus, in FIG. 6A the wire 112 forms an "alternative unlocked circuit" from negative pole 414 via a relay 402 of the controller 106 to terminate at contact 410 within the wire reception socket 104 (FIG. 2).

Accordingly, the controller recognizes that a break in the circuit, or a dislocation of the cable socket 114 from the lock base 102, is improper, and triggers data protection mechanisms described herein, in response to determining that the "alternative unlocked circuit" is not generated (not present, is absent) by the unlocking operation of the key.

Referring now to FIG. 6B, a locking operation of the key 116 (that locks the cable socket 114 onto the locking mount 102, (FIG. 2) moves the conductive bayonet contact 404 into a "plugged" position, wherein the bayonet contact 404 physically, and thereby electrically, connects contact 410 to contact 412, contact 412 is electrically connected to contact 406, which is electrically connected to positive pole 416. The relay 402 thereby selectively completes a circuit from the positive pole 416 through the cable lock wire 112 to the negative pole 414 (via contact 410, bayonet contact 404, and contacts 412 and 406).

The circuit structure of FIGS. 6A and 6B enables the controller 106 to detect if the key 116 has been used to open the circuit, wherein the circuit disconnection is considered safe and appropriate (and data security measures are not triggered). Any action that opens the circuit is considered illegal, wherein using the key 116 to disconnect the cable socket 114 does not open the circuit connected to the controller 106, wherein the electrical contacts 406, 408, 410 and 412 are arranged so that using the key 116 to generate the open circuit illustrated in 6A is distinguishable from an open circuit generated by cutting the cable 113 and thereby the wire 112.

Figure 7:
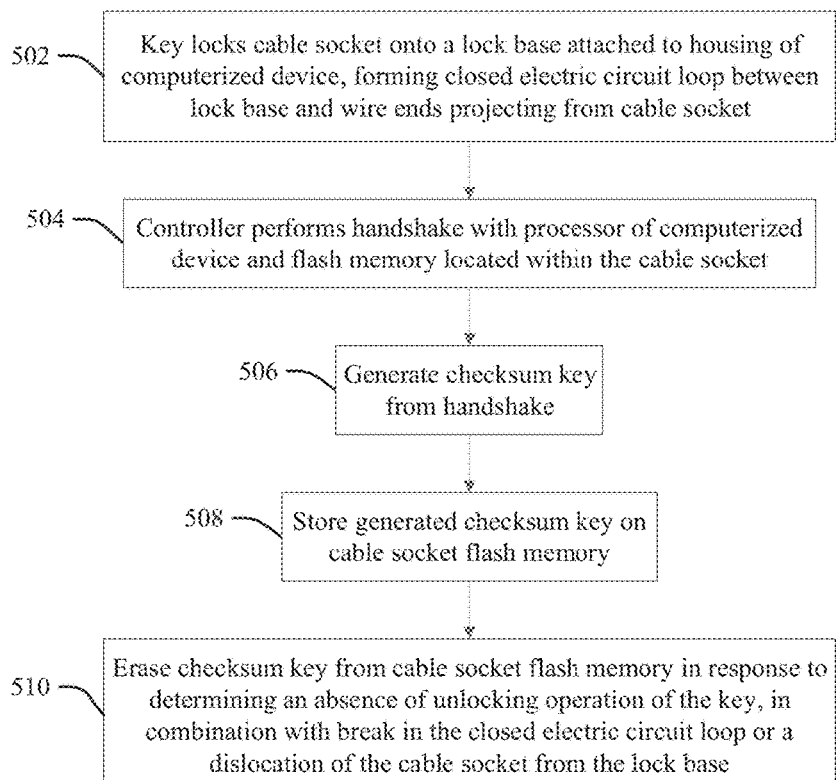
FIG. 7 is a flow chart illustration of an embodiment of the present invention.

FIG. 7 illustrates a method or process according to the present invention for securing data on a computerized device, for example implementing the components of FIGS. 2 through 6B described above. Thus, in response to an input 502 of locking operation by a key that locks a cable socket onto a lock base that is attached to a housing of a computerized device, thereby forming a closed electric circuit loop between the lock base and two ends of a wire that project from the cable socket, wherein the wire is disposed through the entirety of a body of a cable connected to the cable socket, at 504, a controller processor that is configured according to an aspect of the present invention (the "configured processor") performs a handshake with a processor of the computerized device and a flash memory that is located within the cable socket.

At 506 the configured processor generates a checksum key from the handshake, and at 508 stores the generated a checksum key on the flash memory, wherein the computerized device requires access to the checksum key on the flash memory for access to data on a memory device of the computerized device.

At 510 the configured controller processor erases the checksum key from the flash memory in response to determining an absence of an unlocking operation of the key in combination with a condition that is selected from the group consisting of a break in the closed electric circuit loop and a dislocation of the cable socket from the lock base.

Consequences of determining an improper disconnection by aspects of the present invention may vary, according to user-defined levels of confidentiality of data stored on the memory device M (FIG. 2). For example, the controller 106 may directly (or indirectly instigate) a transition of the computerized device C into an inactive state (a sleep or hibernation mode, or a shut-down state, etc.) wherein a user must input their login and password identification information to transition the computerized device back into an active state (waking or booting up, etc.) thereby assuring security from theft of the computerized device C when the user login and password are kept confidential by the user. In some embodiments, the entry of the appropriate user ID and password may enable recovery of the erased checksum key from another memory location (including from the memory device M, a cloud account of the user, etc.).

In alternative embodiments of the present invention data on the memory M is also encrypted as a function of the generated checksum key. In this configuration, in response to determining an unauthorized break in the wire 112 the controller 106 may trigger a shutdown of the computerized device C and an erasure of an encryption key generated from the checksum value for the access to the data on the memory M. Thus, the only way to access the data again requires reinserting the original encryption key. One advantage of destroying the encryption key is that the operation is very fast, but recovery is possible for a user in possession of a backup of the encryption key.

Other variations of protection methods may comprehend any action from a temporary unavailability of the data to its total destruction. Aspects may also protect data when the protected device is turned off, wherein the controller 106 maintains a powered state via an internal battery 120 (FIG. 2), and thereby implements and maintains protection continuously, in a fashion similar to that of an embedded controller of the protected device (for example, one governing battery charging functions, wake up events, etc.). In this way, security measures are triggered immediately, or a suitable flag is set in the BIOS of the protected device, so to have security measures triggered as soon as the protected device is powered on again. Via direct connection to the memory M of the protected device C or to the motherboard CB to interact with the operating system, the controller 106 may directly perform associated tasks or actions appropriate to the protected device C (for example, encrypt memory M data content with the checksum key, shutdown the protected device C, erase all confidential information on the memory M, send global positioning satellite (GPS) position coordinates to a service provider or cloud storage device, trigger an alarm, etc.). When an illegal disconnection is detected, the action designed for the system may be automatically performed by the controller 106, so that the protected device C can respond with an appropriate data-protecting behavior.

Aspects may also provide a time delay, for example a countdown of some seconds added to when an unauthorized (un-keyed) socket 104/114 disconnection or break in the wire 112 circuit is detected, to prevent triggering erasure of the checksum key or destruction of data on the memory M, etc., in the case of an accidental disconnection or temporary interruption due to a bad electrical contact.

Some security settings may trigger a user or supervisor alert instead of automatic erasure of the checksum key or data destruction, etc., for example in response to the controller determining that the computerized device C is in a workplace office or other secure location. The alert may prompt a user or service provider for confirmation of data destruction or triggering of sleep mode, etc., during the delay period, wherein a default method is triggered at the end of the delay period if no cancel command or other response is received from an authorized user during the delay period.

Aspects of the present invention provide advantages over prior art approaches to enhance cable device security by improving or enhancing the resiliency of locking systems, and by adding components and features (pressure sensors, heat sensors, vibration sensors, motion sensors, etc.) to detect motions associated with theft, or damaging high heat (such as from a fire). Embodiments of the present invention may be used with a variety of conventional cables, wherein data security is achieved by component modifications that are generally internal to the overall structure of the device, wherein external cable appearances may be unchanged to visual inspection, and the components of the present invention present cost and management efficiencies over the prior art alternatives. For example, prior art systems provided on a laptop or other protected device, and not on the cable lock, depend on the device configuration, and thereby suffer problems deriving from the usage of motion sensors, inaccuracy in working with external components, or vulnerability to associated device circumventions.

Generally the incorporation of power line wires within locking cables in the prior art requires modification specific to a computer device being protected by said system (for example, see U.S. Pat. No. 6,297,963 B1). Such approaches limit interchangeability within, or broad application to, various different protected computerized devices having different outer chassis configurations, power systems or operating systems. No specific acknowledgment or authorization is taught between cable and the protected device, or any logic of disconnection detection.

Some prior art approaches teach switching off a protected device if a locking cable is cut or otherwise disconnected, which both requires a modification in the way that the protected device connects to a power source, and prevents use of the protected device without connection to the cable lock, preventing a user from using the protected device independently of the cable lock. Such approaches may also be defeated by cutting off a wire in the middle where no acknowledgment between cable and device is provided.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a lock base that is configured for attachment to a housing of a computerized device;
   a controller located within the lock base, the controller in circuit communication with a processor of the computerized device;
   a cable socket comprising a flash memory and configured to lock onto the lock base via a locking operation of a key; and
   a cable attached to the cable socket and comprising an internal wire, wherein two ends of the wire project from the cable socket and the wire is disposed in a loop from the two ends through an entirety of a body of the cable;
   wherein in response to locking the cable socket onto the lock base via the locking operation of the key, the wire forms a closed electric circuit loop with the lock base from the wire ends through the entirety of the body of the cable, and the controller performs a handshake with the processor of the computerized device and the flash memory, and in response to the handshake generates a checksum key that is stored on the flash memory, and wherein the computerized device requires access to the checksum key on the flash memory for access to data on a memory device of the computerized device; and
   wherein the controller erases the checksum key from the flash memory in response to determining an absence of an unlocking operation of the key in combination with a condition that is selected from the group consisting of a break in the closed electric circuit loop and a dislocation of the cable socket from the lock base.

2. The system of claim 1, wherein the controller generates the checksum key as a function of indicia associated with each of the controller and the flash memory.

3. The system of claim 1, wherein the controller causes the computerized device to encrypt data stored on a memory of the computerized device using the checksum key.

4. The system of claim 1, wherein the wire comprises:
   a first strand portion extending from a first of the wire ends through the cable body to a loop portion passing around an end loop formed by the cable body; and
   a second strand portion that is parallel to the first strand portion and extends from the loop portion returning to terminate in an other of the two wire ends.

5. The system of claim 1, wherein the wire comprises a coaxial portion comprising:
   a first cylindrical portion extending from a first of the wire ends through the cable body to a loop portion passing around an end loop formed by the cable body; and
   a second strand portion that is parallel to and encompassed by the first cylindrical portion and extends from the loop portion returning to terminate in an other of the two wire ends.

6. The system of claim 1, further comprising a conductive bayonet contact that:
   in response to the locking operation of the key, connects a pair of contacts within the cable socket to thereby form the closed electric circuit loop as a circuit from a negative power pole via a relay of the controller to a positive power pole; and
   in response to the unlocking operation of the key, forms an alternative unlocked circuit from one of the negative and positive power poles via the relay of the controller to terminate in an alternative contact within the cable socket; and
   wherein the controller determines the absence of the unlocking operation of the key in response to an absence of the alternative unlocked circuit in combination with the condition selected from the group consisting of the break in the closed electric circuit loop and the dislocation of the cable socket from the lock base.

7. The system of claim 1, further comprising:
   a battery located within the lock base and in circuit connection with the controller;
   wherein the controller maintains a powered state via the battery in response to a powered down state of the computerized device; and
   wherein the controller sets a flag in a BIOS of the computerized device in combination with erasing the checksum key from the flash memory, in response to determining that the computerized device is in a powered down state.

8. The system of claim 1, wherein the controller, in response to determining the absence of an unlocking operation of the key in combination with the condition selected from the group consisting of the break in the closed electric circuit loop and the dislocation of the cable socket from the lock base:
   instigates a transition of the computerized device into an inactive state, wherein a user must input login and password identification to transition the computerized device back into an active state.

9. The system of claim 8, wherein the controller enables recovery of the erased checksum key from another memory location in response to user input of the login and password identification.

10. A computer-implemented method for securing data on a computerized device, the method comprising executing on a computer processor the steps of:
   in response to a locking operation of a key that locks a cable socket onto a lock base that is attached to a housing of a computerized device, thereby forming a closed electric circuit loop between the lock base and two ends of a wire that project from the cable socket, wherein the wire is disposed through the entirety of a body of a cable connected to the cable socket, performing a handshake with a processor of the computerized device and a flash memory that is located within the cable socket, wherein the handshake generates a checksum key;
   storing the checksum key on the flash memory, and wherein the computerized device requires access to the checksum key on the flash memory for access to data on a memory device of the computerized device; and
   erasing the checksum key from the flash memory in response to determining an absence of an unlocking operation of the key in combination with a condition that is selected from the group consisting of a break in the closed electric circuit loop and a dislocation of the cable socket from the lock base.

11. The method of claim 10, further comprising:
   generating the checksum key as a function of indicia associated with each of a controller performing the handshake and the flash memory.

12. The method of claim 10, further comprising:
   causing the computerized device to encrypt data stored on a memory of the computerized device using the checksum key.

13. The method of claim 10, further comprising:
   determining the absence of the unlocking operation of the key in response to an absence of an alternative unlocked circuit in combination with the condition selected from the group consisting of the break in the closed electric circuit loop and the dislocation of the cable socket from the lock base.

14. The method of claim 10, further comprising:
   in response to determining the absence of an unlocking operation of the key in combination with the condition selected from the group consisting of the break in the closed electric circuit loop and the dislocation of the cable socket from the lock base, instigating a transition of the computerized device into an inactive state, wherein a user must input login and password identification to transition the computerized device back into an active state.

15. The method of claim 10, further comprising:
   in response to determining that the computerized device is in a powered down state, setting a flag in a BIOS of the computerized device in combination with erasing the checksum key from the flash memory.

16. The method of claim 10, further comprising:
   integrating computer-readable program code into a computer system comprising a controller processor that performs the handshake, a computer readable memory in circuit communication with the controller processor, and a computer readable storage medium in circuit communication with the controller processor; and
   wherein the controller processor executes program code instructions stored on the computer-readable storage medium via the computer readable memory and thereby performs the steps of performing the handshake with the processor of the computerized device and the flash memory that is located within the cable socket, storing the checksum key on the flash memory, and erasing the checksum key from the flash memory in response to determining the absence of the unlocking operation of the key in combination with the condition that is selected from the group consisting of the break in the closed electric circuit loop and the dislocation of the cable socket from the lock base.

17. A computer program product for securing data on a computerized device, the computer program product comprising:
   a computer readable storage medium having computer readable program code embodied therewith, wherein the computer readable storage medium is not a transitory signal per se, the computer readable program code comprising instructions for execution by a processor that cause the processor to:
   in response to a locking operation of a key that locks a cable socket onto a lock base that is attached to a housing of a computerized device, thereby forming a closed electric circuit loop between the lock base and two ends of a wire that project from the cable socket, wherein the wire is disposed through the entirety of a body of a cable connected to the cable socket, perform a handshake with a processor of the computerized device and a flash memory that is located within the cable socket, wherein the handshake generates a checksum key;
   store the checksum key on the flash memory, wherein the computerized device requires access to the checksum key on the flash memory for access to data on a memory device of the computerized device; and
   erase the checksum key from the flash memory in response to determining an absence of an unlocking operation of the key in combination with a condition that is selected from the group consisting of a break in the closed electric circuit loop and a dislocation of the cable socket from the lock base.

18. The computer program product of claim 17, wherein the computer readable program code instructions for execution by the processor further cause the processor to:
   determine the absence of the unlocking operation of the key in response to an absence of an alternative unlocked circuit in combination with the condition selected from the group consisting of the break in the closed electric circuit loop and the dislocation of the cable socket from the lock base.

19. The computer program product of claim 17, wherein the computer readable program code instructions for execution by the processor further cause the processor to:

in response to determining the absence of an unlocking operation of the key in combination with the condition selected from the group consisting of the break in the closed electric circuit loop and the dislocation of the cable socket from the lock base, instigate a transition of the computerized device into an inactive state, wherein a user must input login and password identification to transition the computerized device back into an active state.

20. The computer program product of claim 17, wherein the computer readable program code instructions for execution by the processor further cause the processor to:
  in response to determining that the computerized device is in a powered down state, set a flag in a BIOS of the computerized device in combination with erasing the checksum key from the flash memory.

* * * * *